April 23, 1968 G. G. PICK 3,380,039

READ ONLY MAGNETIC MEMORY MATRIX

Original Filed Jan. 2, 1962 6 Sheets-Sheet 1

INVENTOR.
GEORGE G. PICK
BY F. L. Sullivan
ATTORNEY

READ ONLY MAGNETIC MEMORY MATRIX

Original Filed Jan. 2, 1962 6 Sheets-Sheet 2

INVENTOR.
GEORGE G. PICK
BY F. L. Sullivan
ATTORNEY

INVENTOR.
GEORGE G. PICK
BY F. I. Sullivan
ATTORNEY

INVENTOR.
GEORGE G. PICK
BY F. J. Sullivan
ATTORNEY

READ ONLY MAGNETIC MEMORY MATRIX

Original Filed Jan. 2, 1962

6 Sheets-Sheet 5

INVENTOR.
GEORGE G. PICK
BY F. J. Sullivan
ATTORNEY

READ ONLY MAGNETIC MEMORY MATRIX

Original Filed Jan. 2, 1962

INVENTOR.
GEORGE G. PICK

BY F. J. Sullivan
ATTORNEY

United States Patent Office 3,380,039

Patented Apr. 23, 1968

3,380,039

READ ONLY MAGNETIC MEMORY MATRIX

George G. Pick, Waltham, Mass., assignor to Sylvania Electric Products Inc., a corporation of Delaware Continuation of application Ser. No. 163,451, Jan. 2, 1962. This application July 3, 1967, Ser. No. 651,047
6 Claims. (Cl. 340—174)

This application is a continuation of Ser. No. 163,451, filed Jan. 2, 1962, now abandoned.

This invention is concerned with electronic data processing apparatus and particularly with improved techniques for translating data through signal matrices useful, for example, in alpha-numeric character and other pattern recognition systems.

In many electronic data processing systems information in binary bit signal format is processed into apparatus such as linear registers and two- or three-dimensional matrices of relays, flip-flop circuits, magnetic cores, or other bistable signal elements. This information is then decoded or translated from these registers and matrices to actuate signal circuits or perform other useful functions. A typical example is found in automated apparatus for reading alpha-numeric characters. Many systems have been proposed and developed in which a character to be read is scanned with an optical-to-electronic signal translating device such as a flying spot scanner which frames the character scanned within a suitable two-dimensional matrix of component bistable elements, and either "sets" or "resets" the individual elements of the matrix in accordance with whether a portion of the character under scan or a contrasting background area is sensed in a corresponding elemental area of the scanning raster. The resulting data content of the matrix is then decoded to identify, by pulsing an appropriate signal circuit, the character which has been scanned. It is this area of decoding or translating the data content of such a matrix for comparison purposes which is of primary concern in the present invention.

In a character recognition system representative of the present state of the art, U.S. Patent 2,978,675 describes a decoding technique in which the unknown character scanned is loaded into the elemental areas of a matrix whose content is then compared in a computer with a library of probable characters to which the unknown might conform. A signal of maximum comparison with one of the probable matrices establishes the identity of the unknown character. An additional feature of the recognition system described in this patent is a technique for weighting the component elemental areas of the character matrices so that maximum cognizance is taken of significant elemental areas in the determination of any given character and minimum or negative cognizance is taken of insignificant areas or those which should have no signal content to contribute to the formation of the character concerned. Although the weighted matrix approach of which one type is described in this patent offers considerable advantages, its implementation requires costly and complicated computer equipment for translating the data contained in a register or a matrix into a reliable signal indication of a given character.

In another type of approach, attempts have been made to substitute intricately wired magnetic core matrices for computers to perform the signal correlations and comparisons required for recognition. In these structures, a separate sense winding is threaded through the cores in a unique path for each pattern to be recognized. It will be readily appreciated, however, that this involves very serious manufacturing problems. Each sense winding has its own individualized pattern and, if weighting is to be provided, must be looped around some cores several turns. Consequently, fabrication is tedious, complicated, and requires extremely critical threading of long lengths of relatively stiff wire through the cores. Moreover, with a separate sense winding required for each character to be recognized, a given matrix of cores can accommodate relatively few sense outputs (and, hence, recognize few characters) before requiring that the cores of the matrix become so large that the switching time of their recognition cycle becomes relatively slow and considerable power is required to drive them. Other problems with this type of structure arise from inductive and capacitative coupling and cross talk between conductors, stray signal pick-ups, etc.

Accordingly, a primary object of the present invention is to provide an improved technique for translating data from storage registers and matrices. Additional objects are to provide an improved means for comparing the signal content of one matrix with a plurality of matrix configurations and determining which is most similar. Still further objects are to provide an improved signal translating device and apparatus useful for the purposes described and an improved technique for electronic data processing, particularly with weighted matrices.

These and related objects are accomplished in one embodiment oft he invention which features an elongated solenoid into which a signal may be coupled from a data translating device such as a bistable magnetic core and from which substantially uniform signals may be derived in a transformer action by each one of a very considerable plurality of pick-up coils. In the application of this embodiment of the invention to the problem of character recognition, signals representing an "unknown" character are processed by a flying spot scanner or other apparatus into a matrix of magnetic cores and a plurality of these elongated solenoids is employed to couple the signal content from the individual cores of the matrix to any desired plurality of output signal circuits each representing a separate "known" character with which the "unknown" character is compared to establsh identity. These signal circuits may be planar arrays comprised of circuit boards or plastic sheets upon which pick-up coils arranged to encircle the solenoids have been deposited by etching, printing, etc. in patterns conforming to matrix representations of the various characters which the system is expected to recognize. They are assembled by stacking the circuit planes representing the characters to be recognized, one upon the other, with the elongated solenoids passing through the coils on the planes.

The use of solenoid conductors with both ends connected to the sense winding of a bistable magnetic core results in an open-ended structure upon which the aforementioned circuit planes with their pick-up coils can be placed or replaced without disturbing the array or requiring making and breaking of electrical circuits except for an output connection for added planes. Furtheremore, the long, thin solenoid structure presents a uniform voltage input to pick-up coils positioned along its entire length, except for the area immediately adjacent the solenoid ends. Also, the alignment of the pick-up coils with respect to the solenoid axis is not critical, and over broad limits the diameter of the coils or their eccentricity with respect to the solenoid axis can be changed without seriously affecting the signal induced into the pick-up coils. Consequently, this apparatus provides a very effective input for large pluralities of signal comparisons and a more reliable, more adaptable, less complicated and less expensive matrix decoding of the type required for alpha-numeric and other pattern recognition systems than has hitherto been available.

The construction and operation of this character recognition equipment and other objects, embodiments, modications and features of the invention will be more apparent from the following description with reference to the accompanying drawings, wherein.

Figure 1:
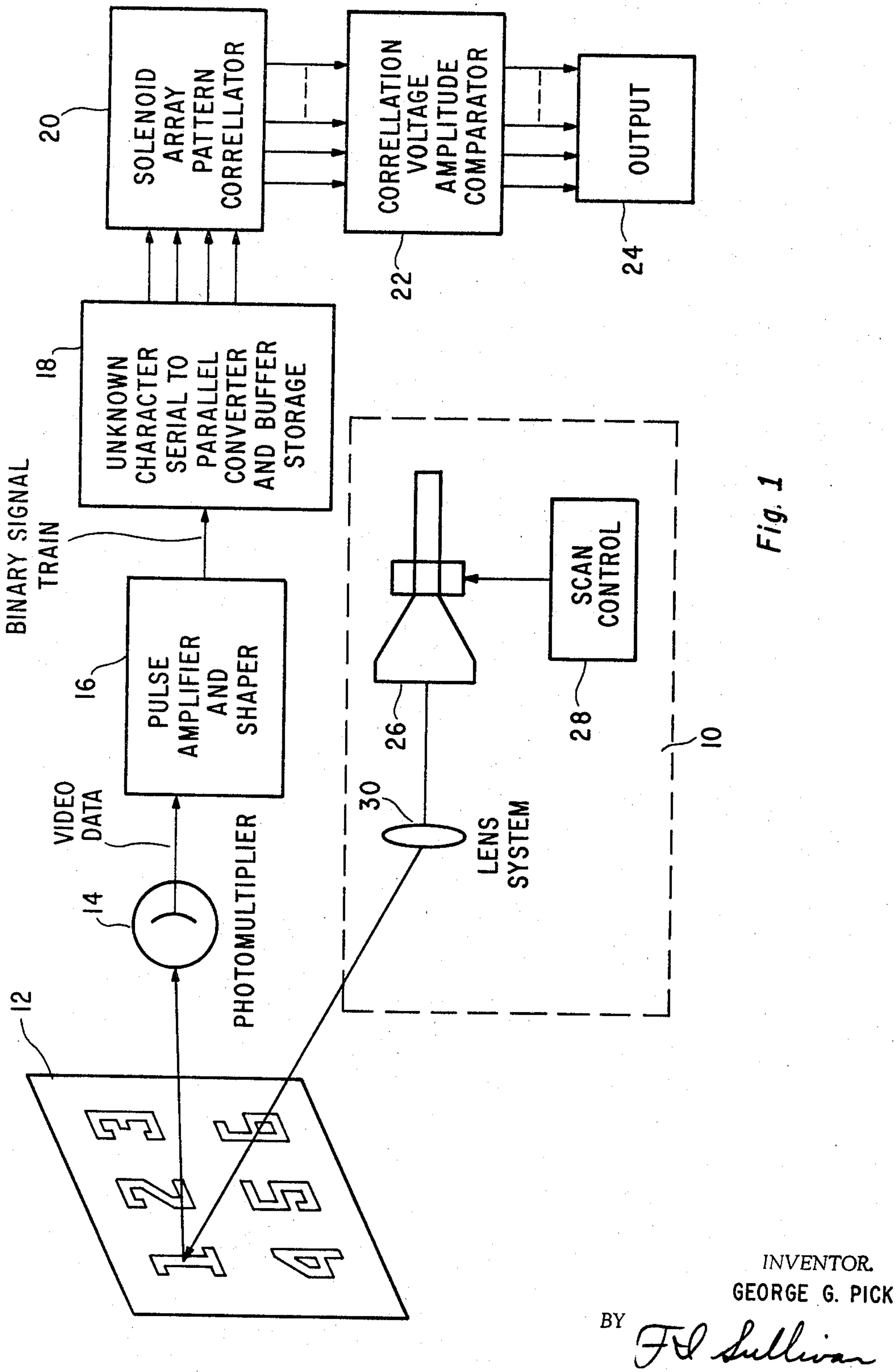
FIG. 1 is a block diagram of an alpha-numeric character recognition system utilizing a data translating embodiment of the invention.

The character recognition system of FIG. 1 comprises a flying spot scanner 10 arranged to scan individual characters on a document 12 with a point of light which produces output video signals from a photomultiplier 14 indicative of the light or dark condition of each elemental area within which the character under scan is framed by the scanning raster. Video signals from the photomultiplier 14 are processed through pulse amplifier and shaping circuits 16 to an unknown character serial-to-parallel converter and buffer storage unit 18. The unknown character data is then translated from the buffer storage unit 18, via a signal pattern correlating array of solenoid 20, to a correlation voltage amplitude comparator 22 which provides an unknown character identification signal to an output or storage device 24.

The construction and operation of the flying spot scanner apparatus of FIG. 1, from the cathode ray equipment 10 through the unknown character serial-to-parallel converter and buffer storage 18, is well known in the electronic data processing art and not a part of the present invention which is applicable to a wide range of electronic data processing and decoding systems as well as this flying spot character scanner which is referenced to demonstrate the utility of the invention. Consequently, the present description will not present a detailed explanation of the flying spot signal translating and related matrix loading apparatus.

Briefly, in the system of FIG. 1 the scanner 10 features a cathode ray tube 26 which is caused by appropriate scan and raster control circuitry 28 to produce through focusing lens 30 a miniscule spot of light which frames the intelligence on document 12, a character at a time, with a scanning raster. The light from the raster is reflected from the surface of the document 12 to a photomultiplier device 14 which produces an output video signal train indicative of the relatively light or dark condition of each elemental area traversed by the spot as it scans its raster over the printed or written character and the background area upon which it is printed. This pulse train is processed through conventional threshold sensitivity, pulse amplification and shaping circuits, etc. represented by the block 16 to produce a binary signal train comprised of a "1" or "0" signal depending upon whether the flying spot finds a light or a dark response as it traverses each elemental area of its raster.

This binary signal train comprises, for each character, a number of data bits corresponding to the number of elemental areas into which the raster which frames the character is to be divided for purposes of subsequent analysis, and the serial-to-parallel conversion and buffer storage equipment of block 18 includes an equal number of bistable binary bit signal storage elements so that the buffer storage, after a given character has been scanned, contains a binary bit signal sequence representative of the unknown character which has been scanned. The number of bits in this sequence depends upon the resolution required of the system design. In the system under description, satisfactory results have been experienced with the character formats shown in FIG. 5 being analyzed in a nine by five matrix of forty-five elemental areas. The manner in which this analysis is accomplished will now be explained in more detail.

Figures 2, 3:
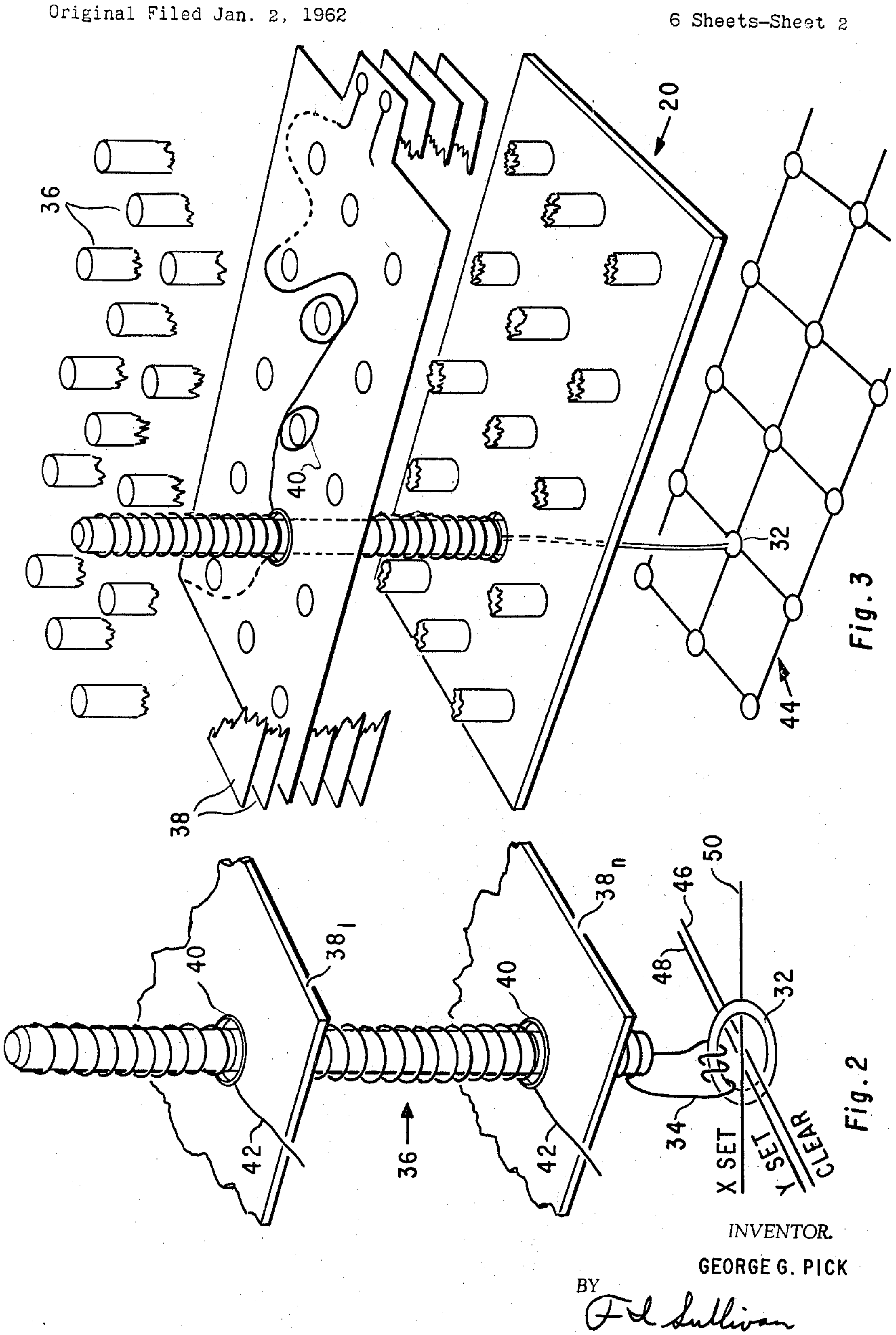
FIG. 2 is a perspective representation of a data storage magnetic core with a solenoid readout, as employed in practicing the invention.
FIG. 3 is a perspective representation of a solenoid-operated data translating matrix employing the devices of FIG. 2.

For the purposes of the present explanation, we may assume that each bit of the binary signal sequence representing an unknown character is stored in a bistable magnetic core 32 of the type shown in FIG. 2. These cores may be considered as the output stages of the buffer unit 18 in FIG. 1. Referring to FIG. 2, each data core 32 has its sense winding 34 connected as the input to an elongated solenoid 36. This solenoid, which may be comprised of a paper tube, ceramic or plastic rod or other rod-like non-magnetic structure along the length of which an electrical extension of sense winding 34 is wound, intercepts a number of logic planes $38_1$–$38_n$, and pick-up coils 40 encircle the solenoid at its point of interception of each plane. Thus, the coil 40 on any plane is enabled to provide, via a conductor 42, an output signal whenever an input signal is induced into the sense winding 34 of a core 32 and is translated by further magnetic induction from the extension of sense winding 34 along the length of the solenoid to coils 40 on the logic planes. The solenoid winding 34 may be double wound starting from the core 32 up the length of the solenoid 36 and back down to the core, or the return winding can be omitted and a direct connection made, either inside or outside the solenoid, back to the core.

FIG. 3 shows how a matrix of buffer storage cores 44 may be individually connected to a plurality of individual solenoids 36 intercepting a number of logic planes 38 which are stacked one upon the other to comprise the solenoid array pattern correlator 20 of FIG. 1. If each of the logic planes $38_1$–$38_n$ of the pattern correlator 20 of FIG. 3 is individually fabricated with a distinctive continuous pattern of coils 40, in a manner which will be explained in detail below, to represent an individual "known" character of the type the equipment under description is to recognize, then when an "unknown" character (translated to electrical signals stored in the magnetic core matrix 44) is processed through the correlator 20 by parallel transfer of the data content of all the cores in matrix 44 along the respective solenoids to which they are connected, the "known" character logic plane experiencing the greatest input signal will identify the "unknown" character.

Figure 4A:
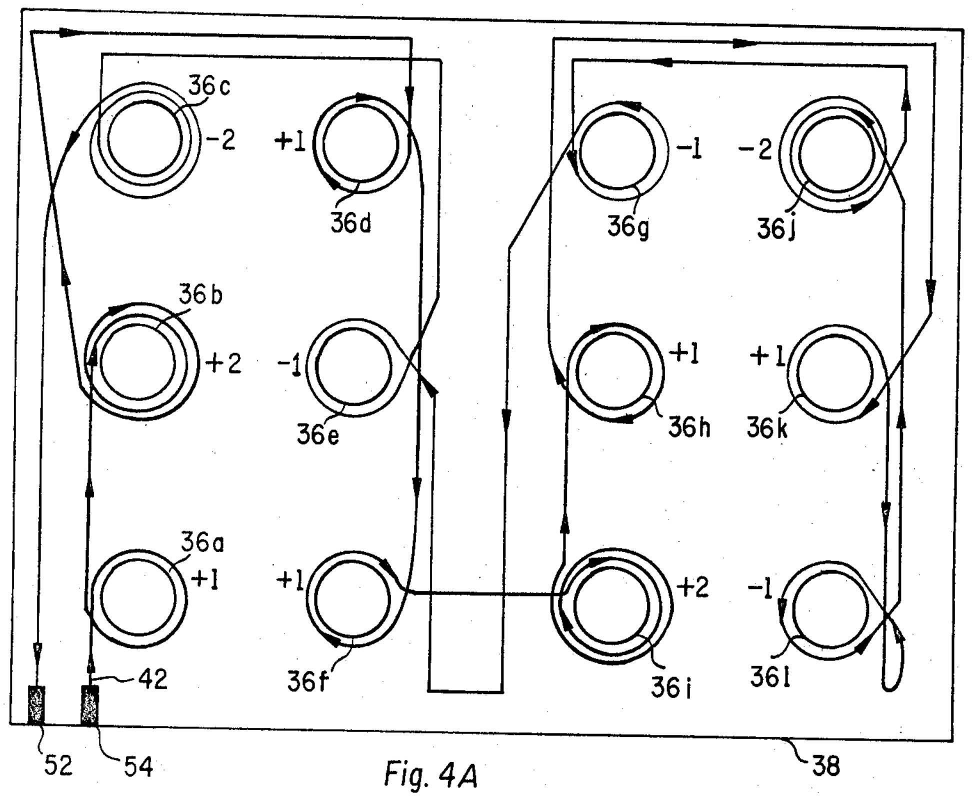
FIGS. 4A and 4B are diagrammatic representations of two different types of logic planes useful in the data translating matrix of FIG. 3.
Figure 4D:
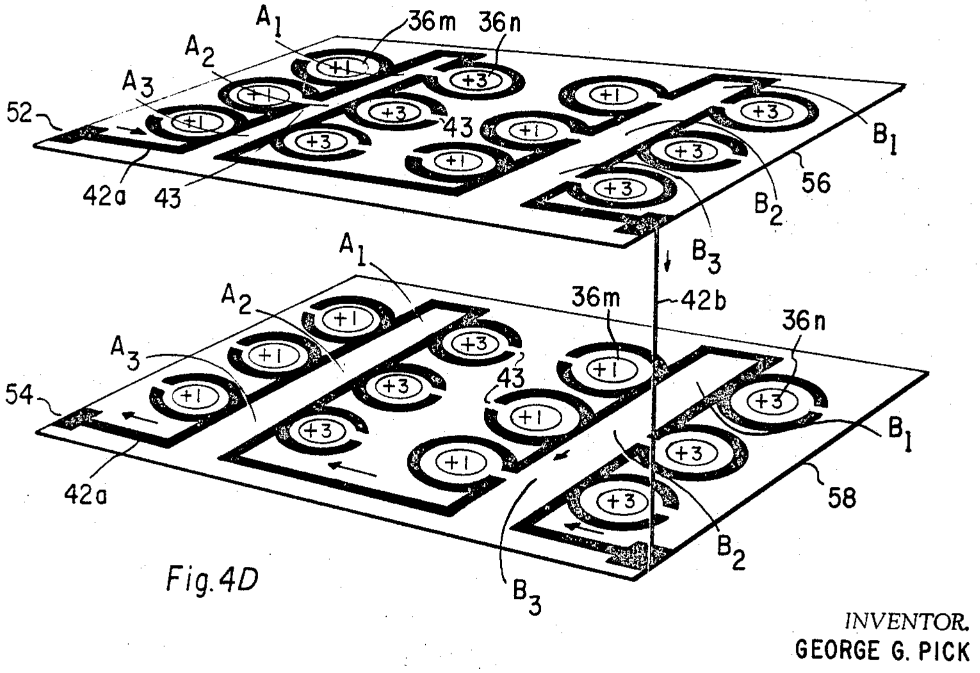
FIG. 4D is another type of logic plane which may be utilized in practicing the invention.
Figure 4B:
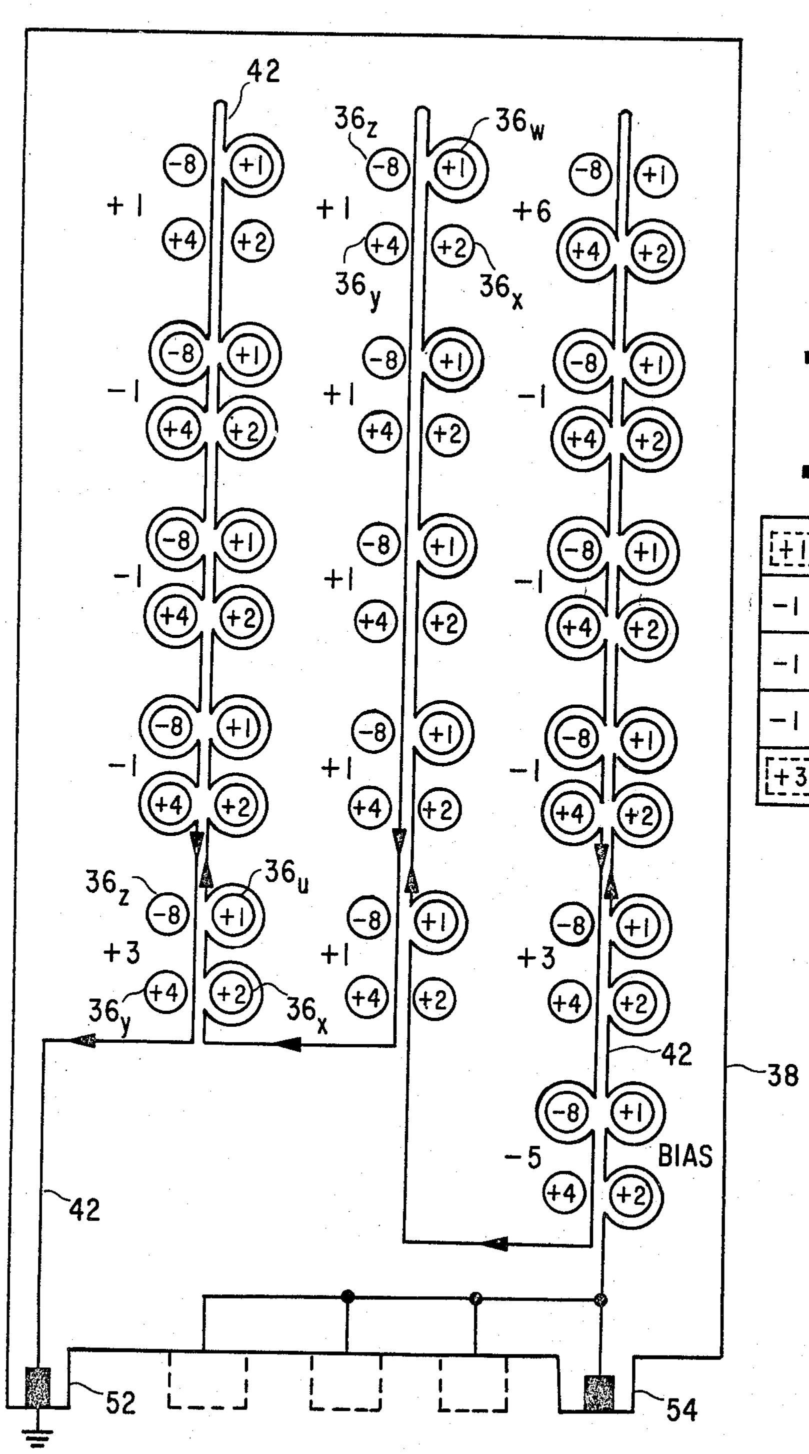
Figure 5:
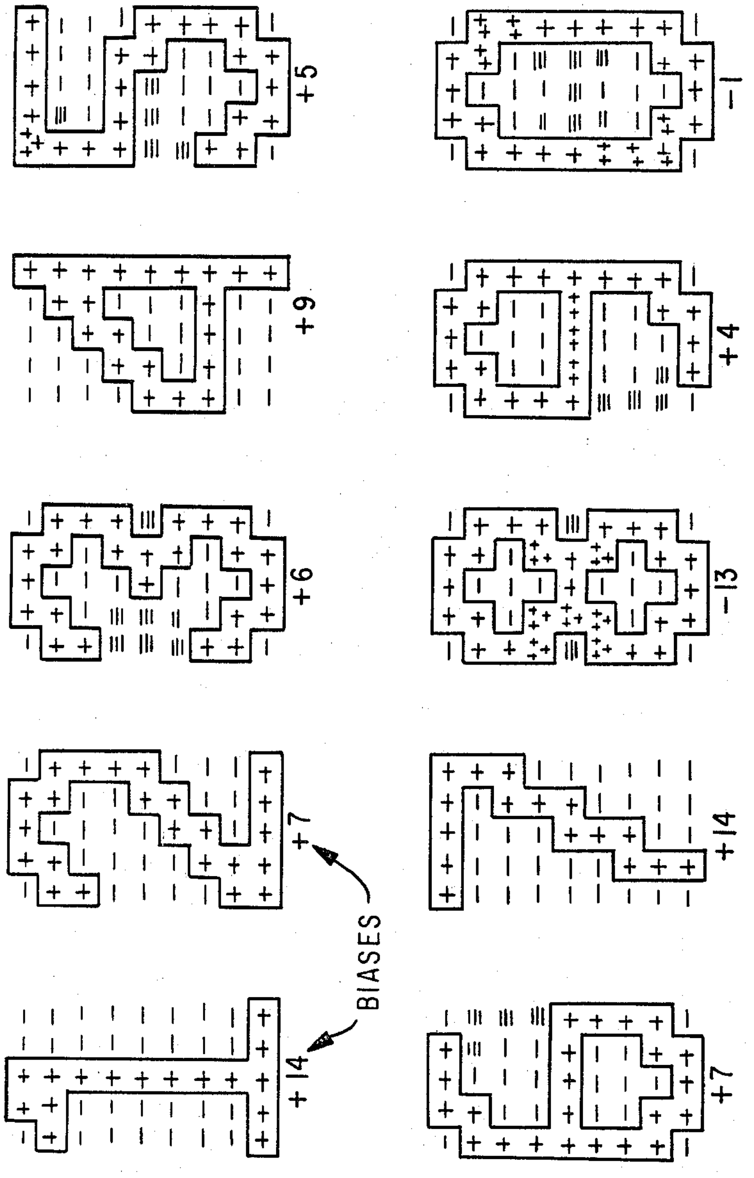
FIG. 5 is a diagrammatic representation of the numeric characters 1–0 in a representative type font readable by the apparatus of FIG. 1 with appropriate weighting of elemental areas of the character format to assist in recognition.
Figures 6, 7, 8:
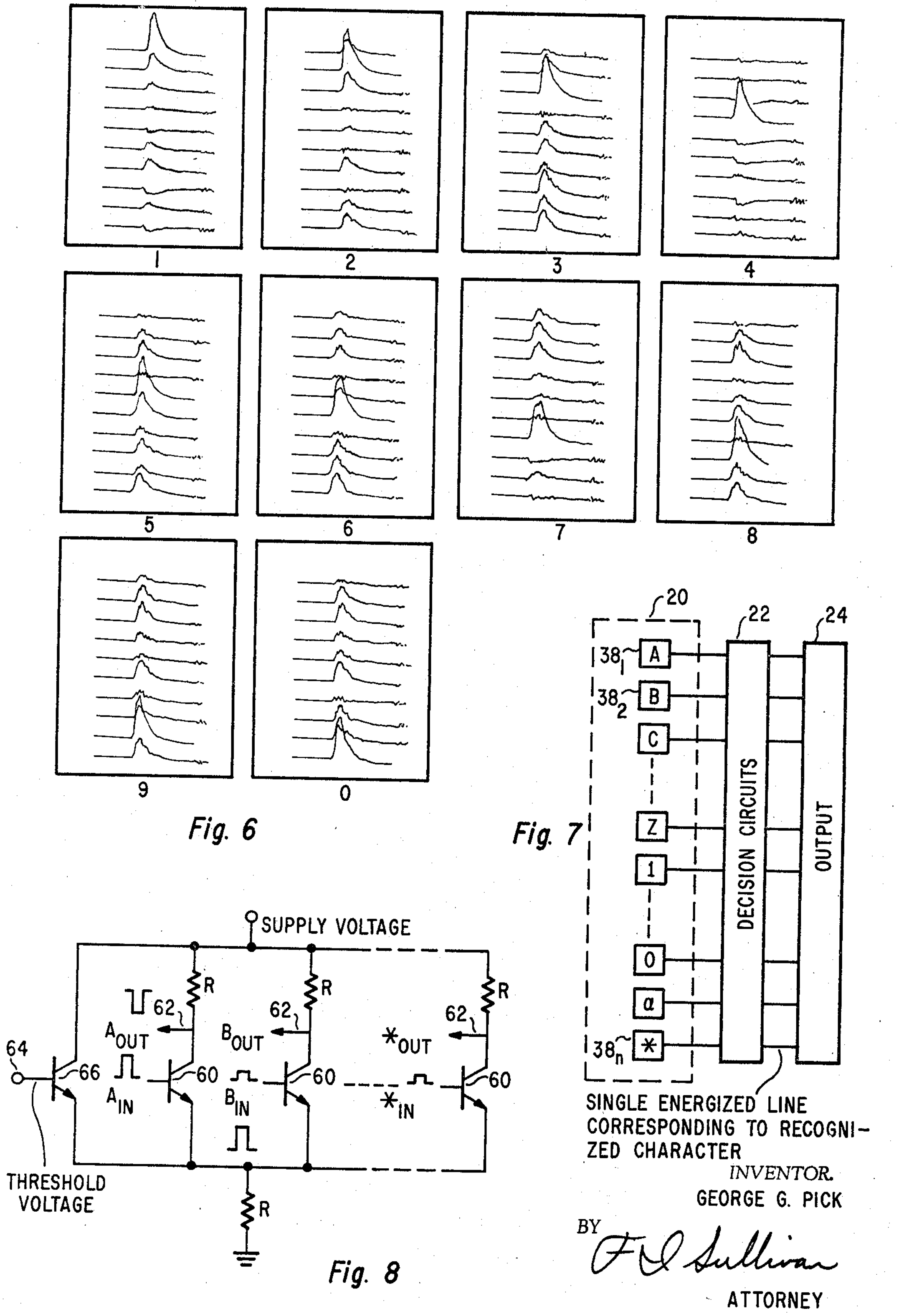
FIG. 6 is a series of diagrammatic representations of signal response of the characters of FIG. 5 in the system of FIG. 1.
FIG. 7 is a more detailed block diagram of the correlation, comparison, coding and output circuits of the apparatus of FIG. 1; and, FIG. 8 is a schematic diagram of a signal comparison circuit useful in the subsystem of FIG. 7.

FIGS. 4A, 4B and 4D demonstrate how the logic planes 38 of correlator 20 may be fabricated to provide adequate recognition and weighting signals. FIG. 5 provides an illustrative font and weighting analysis for a representative group of characters, viz., digits 1–0, and FIG. 6 is a representation of comparative signals experienced in identifying each one of the ten numerals of FIG. 5 using the nine by five matrices and weighting shown. FIG. 7 is a block diagram representation of how the particular logic plane 38 which experiences the greatest signal response is identified by a correlation voltage amplitude comparator 22 and an appropriate signal indication is processed to a suitable output device 24 such as a printer, display, etc. The manner in which these components are constructed and operate will now be described in more detail.

Referring to FIGS. 1, 2 and 3, before a character is read by the scanner 10, the core matrix 44 in the buffer storage unit 18 (which also serves as the input to the solenoid array pattern correlator) is cleared by introducing a suitable flux resetting pulse along the "clear" conductor 46 which links all of the individual cores 32 comprising the matrix 44. In the configuration shown this "clear" pulse can be the "read" pulse for the preceding character. As the flying spot traverses the character under scan with its video-pulse-producing raster, each component core 32 of the matrix 44 is sequentially energized by a "half-write" or *y*-set pulse introduced to its particular y-coordinate winding 48. Simultaneously, the signal train containing the video data derived from the photomultiplier 14, converted into binary bit signal representation, is applied to the *x*-coordinate winding 50 of each core in a serial progression. If the video data indicates a binary 1, the pulse to the *x* winding is equivalent to a "half-write" and its coincidence with the "half-write" pulse on the *y* winding linking the same core will produce a flux reversal of the core to store a binary 1 signal. If, however, the serial signal train indicates that a binary 0 is to be stored in a given core when it is energized by pulsing its *y* winding, no signal is transmitted to the *x* winding of the core addressed and no flux reversal takes place thus leaving the core in 0 condition.

When it is desired to read the data representation of an unknown character from the matrix 44, a "clear" pulse, transmitted in the direction of the arrow along the conductor 46 through all the cores 32 of the array, reverses the flux condition of all of those cores which have been set in binary 1 condition. Thus, each of the solenoids 36 will process a signal input into the pattern correlator 20 if its respective switch core 32 had been storing a binary 1 and no signal if its core had ben in 0 condition. These signals induced into the conductors 34 of the solenoids 36 are transduced to coils 40 on planes 38 with the coils acting as the secondary winding of a transformer for which the solenoid 36 serves as a primary.

For the purpose of illustration, a representative logic plane is shown in FIG. 4A. Here, a plurality of solenoids $\mathbf{36_a}$–$\mathbf{36_l}$ are arranged in a three by four matrix. The conductor 42 carried by this particular plane 38 may be traced from terminal 54 in a path which involves none, one, or more loops around the individual solenoids $\mathbf{36_a}$–$\mathbf{36_l}$ and finally returns to terminal 52. Thus, conductor 42 will have induced into it a net total positive or negative signal resulting from the input of the various solenoids $\mathbf{36_a}$–$\mathbf{36_l}$ and the weighting produced by the number and the direction of the turns that the conductor takes around the individual solenoids. For example, two clockwise turns around solenoid $\mathbf{36_b}$, as shown, produces a +2 weighting and two turns in the counterclockwise direction around solenoid $\mathbf{36_j}$ produces a −2 weighting. The net signal induced into the conductor 42 is derived across terminals 52 and 54 for processing to the correlation voltage amplitude comparator 22 where it is compared with the signals derived from other logic planes 38, representing other known characters, and thus makes a comparative contribution to the identification of the unknown character which is identified by the particular logic plane which produces the greatest signal.

Figure 4C:
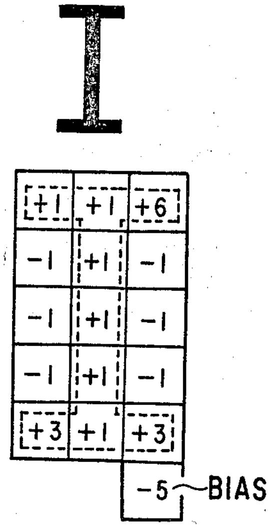
FIG. 4C is a diagrammatic representation of the character "I" as it is weighted for fabricating the logic plane of FIG. 4B.

FIG. 4B demonstrates an alternative form of logic plane 38. In this plane four solenoids 36 are employed per bit to provide individual weighting of each of the elemental areas of the scanned raster. For purposes of illustration, the plane of FIG. 4B has been shown as it would be arranged to recognize the character I as weighted in the five by three matrix of FIG. 4*C*. Referring to FIG. 4C, it is apparent that an optical-electronic transducer scanning the character I in a matrix three elements wide by five elements high would find positive signals (representing the black of the character) in the top three and the bottom three elemental areas and in the five elemental areas up through the center of the matrix. By contrast, the background upon which the letter is printed will show up as negative signals in the three center elemental areas on either side edge of the matrix. To assist in recognizing this character, all of the elemental areas which it is expected that the printed character will occupy are coded with a positive weighting and all of the areas in which this particular character should make no printed impression are weighted with negative signals. In addition, since an I in the particular type font of interest might be confused with a numeral one (1), the upper right hand corner of the matrix which should contain a printed impression if the character being read is an I and no printed impression if the character under scan is a "1" is given an extra weighting of +6. Similarly, since other letters could also occupy the central line of elemental areas in the matrix, the two bottom corners are weighted with a +3 signal value to lessen the probability of one of them being mistaken for a I.

The weighting indicated by the matrix of FIG. 4C is implemented in the logic plane of FIG. 4B by assigning four solenoids per data bit with each bit corresponding to one of the fifteen elemental areas of interest. To accomplish the desired weighting in the arrangement shown, each group of four solenoids is comprised of one solenoid $\mathbf{36_u}$ wound in the proper density and direction to give a relatively +1 signal output, a second solenoid $\mathbf{36_x}$ wound in the same direction but twice the density so that it produces a relatively +2 signal, a third solenoid $\mathbf{36_y}$ also wound in the same direction and with twice the density of solenoid $\mathbf{36_x}$ so that it produces a +4 signal and fourth solenoid $\mathbf{36_z}$ wound in the opposite direction from the other three and with twice the density of solenoid $\mathbf{36_y}$ so that it contributes a −8 to the signal content on conductor 42. By utilizing various combinations of these four solenoids as an input for each data bit, it is possible to cover a weighting signal range from −8 to +7. Other desired signal ranges can be accomplished with other combinations of solenoids per data bit. Alternative arrangements to accomplish similar weighting without requiring different windings on the solenoids utilize series-parallel combinations of solenoids such that more current flows through some than others thereby inducing greater signals in the pickup coils.

In addition to weighting the various elemental areas of the matrix, this logic plane introduces a bias signal to normalize the output of all the signal planes which are to be compared against the "unknown" character. For example, a *c* may provide a signal input to a relatively few elements of the matrix whereas a W will provide possibly twice as much input. In order that the recognition signal for each character be substantially uniform, the biasing feature of this logic plane adds or subtracts the proper number of signal units to compensate for excessive or deficient signal input from large and small characters respectively. The effect of this weighting will be more apparent from an analysis of the weighting assigned to the ten numerals presented in FIG. 5. Study of the weighting and bias of these figures shows that the net result for each, after biasing, is a count of thirty positive units. The input for the solenoids which provide the bias is derived from an extra core 32 in the matrix 44. A "1" signal is always read into this core for each character processed through the matrix.

The output terminals 52 and 54 for the logic plane of FIG. 4B are arranged so that one, e.g., 52, may serve as a ground tab in a common position for all of the planes 38 in the array 20 of FIG. 3. The location of the other tab 54 may be selected from a number of possible positions by breaking off undesired tabs shown in dotted line in FIG. 4B. This provides clearance between the output terminals of adjacent planes.

A third type of logic plane is shown in FIG. 4D. In this configuration, two etched circuit boards take the place of a single plane in the structures previously discussed. Two solenoids are provided per bit ($A_1$, $A_2$, $B_1$, etc.). One solenoid $36_m$ is wound with a +1 weighting. The other solenoid $36_n$ is wound with a +3 weighting, and an etched circuit encircles both solenoids of every bit on each plane. Thus, since the planes are mounted on the solenoids with an end print connection $42_b$ providing electrical continuity between boards, a conductive circuit is established, in the manner shown, from terminal 52, via etched conductor $42_a$ in a forward direction with respect to the solenoids for circuit board 56 and in a return direction with respect to the solenoids for circuit board 58, to terminal 54; and, tertiary weighting is available in positive and negative one and three step increments to provide a range from −4 to +4.

Since the etched conductor $42_a$ loops every solenoid on every board, the result of electrically encircling only desired solenoids on the boards is accomplished by rupturing, for each solenoid path, either the portion of the circuit which bypasses that particular solenoid so that the net result is to encircle it with the conductor or by rupturing the portion of the circuit which encircles the solenoid so that the net result is to eliminate that solenoid from the electrical path of conductor $42_a$. The desired breaking 43 of electrical continuity can be accomplished by punching, filing, abrading, etc., with suitable manual, automated or semi-automatic equipment and processes.

From the foregoing it will be appreciated that various types of logic planes may be utilized in practicing the invention. Similarly, considerable numbers of individual planes 38 may be employed in the solenoids array pattern correlator 20 to give the equipment the capability of recognizing a wide range of individual alpha-numeric characters, symbols, etc., in various type fonts. Moreover, the recognition capacity of a given installation of this system can be increased by simply adding additional logic planes to represent algebraic symbols, additional type fonts, etc. This is a considerable advantage over present state of the art proposed character recognition equipments which are limited to captive type fonts or which require complicated computers and other apparatus to extend their capability beyond a very limited number of possible character identifications.

A representative coding in a nine by five matrix for recognizing the numerals 1 through 0 is shown in FIG. 5. It will be appreciated, of course, that the apparatus is not limited to recognition of the component block form of character format shown. This is merely a weighting of a rectangular matrix to accommodate it to a type format wherein the component numerals follow the path of the elemental areas marked with a plus (+) signal indication, but with the smooth lines of a convention type font instead of the square block aggregations shown.

FIG. 6 is a reproduction of oscillographs showing the signal output on ten lines from the solenoid array pattern correlator 20 when ten logic planes 38 have been prepared to represent the ten numerals shown in FIG. 5 in the nine by five matrices and with the weighting and bias indicated. For a read-out from the buffer storage 18 of a stored indication of each of the numerals 1–0, the comparative signals on each of the ten output lines concerned is shown in the graphs corresponding to each of the numerals read.

FIG. 7 shows, in block diagram form, how the output lines from the solenoid array pattern correlator 20, each connected from a separate logic plane $38_1$–$38_n$ and representing a different character or symbol A–Z, 1–0, *, etc., are connected to a correlation voltage amplitude comparator 22 which performs confidence and threshold decisions and identifies the plane, and consequently the character, symbol, etc., providing the greatest signal input. This identification is then applied to an output device 24 which prints, displays, etc., the identified character.

A suitable circuit useful for performing the threshold and amplitude comparison functions indicated by the block 22 in FIGS. 1 and 7 is shown schematically in FIG. 8. Here, a separate transistor 60 is assigned to each of the inputs to block 22 from the separate logic planes $38_1$–$38_n$. That transistor which experiences the highest voltage signal input to its base will conduct and, via its base-to-emitter circuit, will back bias all of the other transistors so that they will be rendered non-conductive; and the conducting transistor, only, will provide an output signal at its collector terminal 62. The circuit is shown identifying the character A. In order to provide a minimum threshold or signal amplitude which must be exceeded before the data from logic planes 38 is identified with confidence as a character, a limiting or threshold voltage is applied via terminal 64 to transistor 66. This voltage keeps transistor 66 in conducting condition and the transistor, via its base-emitter circuit, applies the threshold voltage at terminal 64 to the emitters of all of the transistors 60 so that the signal input to their bases must exceed this threshold limit before any one of these transistors will become conductive and produce a character identification signal output.

Although the basic concept of this invention may be practiced by employing bistable circuit elements other than magnetic cores for the input to the pattern correlator 20 and event elements such as photocells which may not be bistable; and although devices other than solenoids (e.g. capacitances) may be employed to translate the data from these input elements, the combination of magnetic cores driving long, thin solenoids presents many advantages. For example, the use of air-core, paper tube solenoids provides a simple, inexpensive, and yet extremely uniform and reliable signal transfer device. Furthermore, since each solenoid winding is connected at both ends to the sense winding of its input core and is inductively coupled to the logic planes, there is no electric wiring between the planes and the cores and additional planes can be placed and replaced on the solenoids to increase or change the correlation capability of a given array with a minimum of difficulty.

The driving capacity of the solenoid arrangement described is very satisfactory. An extremely uniform field along the entire length of the solenoid (to within a distance of approximately two diameters of the end) makes it possible to accommodate a very considerable number of circuit planes (and consequently character type fonts) with small, fast-switching ferrite cores. This enables the contents of the "unknown" character matrix to be compared with hundreds of "known" characters in a single operation with a microsecond time cycle. For example, with solenoids one quarter of an inch in diameter and six inches long, the diameter of the pick-up coil can be varied from one quarter of an inch to an inch and the loop positioned concentrically or eccentrically with negligible difference in signal output. Even with two inch diameter loops signal output has been observed to fall off by less than 25%. These features make it possible to provide the pick-up coils on etched circuit boards with non-critical mechanical centering around the solenoids and with signal transfer weighting accomplished by concentric etched circuit loops around the same solenoid on a given circuit board. Moreover, although the output impedance of the pick-up loop around the solenoids of order of 0.1 and 0.25 inch in diameter is less than 0.2 ohms the sense windings of the cores 32 carry little current and the signal circuit planes 38 feed into very high impedances; consequently, thousands of planes 38 can be accommodated by a single array of solenoids 36 with negligible loading and negligible interference.

In addition to its signal transfer qualities, the inductance of the solenoids 36 offers other advantages. In the apparatus described it limits the current drawn by the apparatus linked to the magnetic cores 32. Consequently, since the currents drawn are relatively small, the square loop characteristics of the toroid are unaffected. This feature is inherent to the solenoid structure and eliminates the need for intermediate components. The inductance can be varied by the usual means, viz. variation in diameter and variation in the number of turns, to produce the desired impedance.

It has been found experimentally that as long as the ratio of the distance between turns to the solenoid diameter is kept reasonable, the field along the solenoid remains uniform. For example, 20 turns to 60 turns per inch on a 1/4 inch diameter solenoid winding give satisfactory signals throughout the range, although they do vary somewhat in output impedances.

The low resistance of the coupling and the solenoid wire along the inductance of the solenoid give a rela tivel long time constant during which the current continues to flow after the termination of the toroidal core switching impulse. Though this has little effect on the pick-up coil output, if it is desirable to reduce this time constant so that one current transient is over before next begins, ordinary resistance wire (nichrome) may be employed to give the desired resistance to reduce the $$\frac{\text{inductance}}{\text{resistance}}$$

time constant. Two or three ohms have been found ample to cause a reasonable current decay of the order of a microsecond for 4 inch long, 1/4" diameter solenoids.

Since the magnetic field around the solenoid is dependent in each portion on the current flowing in the solenoid at that point, it is necessary to consider the transmission time of the current through the solenoid. In this connection, it should be noted that in the pattern correlator 20 all the plane 38 outputs are compared in amplitude to detect the largest. Consequently, simultaneity of output from sense wires along the solenoid must be approximated. It is possible to equalize the delay externally, but this is not necessary with proper design. For example, the delay through a 6 inch solenoid is of such small magnitude that no phase shift is discernible on an oscilloscope between output loops at opposite ends of the solenoid for switching cycles below seven megacycles. The estimated delay in 6 inch, 40 turns per inch solenoids is 20 nanoseconds. Since, however, the peak of the impulse of a .080 O.D., .050 I.D. core 32 driven by one ampere is reasonably uniform for 50 nanoseconds, with a total switching time of 200 nanoseconds, this observed delay is not critical. If very much longer solenoids are employed, slower switching cores (i.e., .150 O.D., .087 I.D., 1 to 5 microsecond switching time) are available.

The output of the circuit planes 38 is a function of the number of turns of the loops 40 around the solenoid, the number of times that the solenoid wire encircles the core 32 as a sense winding, the inductance of the solenoid (i.e., solenoid diameter, length, and number of turns) and the speed and magnitude of the core switching impulse. Typical values of output for one turn around the solenoid, with the solenoid wire encirling the core four times, for a 4 inch long 1/4 inch diameter solenoid, are from ten to twenty millivolts. This value of output voltage is very satisfactory in the pattern correlator 20 where many tens or hundreds of outputs are summed in series.

Interference between solenoids in an array 20 is minimized if the solenoids 36 are wound around non-magnetic cores. With such structures loops which do not encircle a given solenoid will not, even if they touch the solenoid, pick up cross talk signals strong enough to interfere with system performance.

The invention has been described, for illustrative purposes, as it has been employed in an alpha-numeric character recognition system. It is not, however, limited to the details of this description but may be embodied in other configurations employing other types of hardware and components and is useful to recognize patterns other than alpha-numeric characters and symbols and in other types of electronic data processing systems. For example, the input to the solenoids 36 need not be derived from magnetic cores but may be provided by relays, flip-flops, diodes and other types of signal generating or storage circuits. Similarly, althought he solenoid array pattern correlator has been described as processing signals from a single input to a plurality of outputs for each of the solenoids 36, it will be readily apparent to those skilled in the art that the same basic technique may be employed to process signals in the opposite direction from a plurality of inputs back to a single output for each solenoid.

Thus, the invention is not limited to the specifics of the preceding description and drawings, but embraces the full scope of the following claims.

What is claimed is:

1. A read only memory system comprising:

a first plurality of electrically insulative sheets each having a second plurality of holes therein arranged in a common pattern, said sheets being arranged in a stacked configuration with the pattern of holes in respective sheets being in registration to provide aligned openings through all of said sheets;

a plurality of solenoids each capable of providing a substantially uniform magnetic field throughout its length, each solenoid extending through a respective aligned opening;

a conductive pattern disposed on each sheet in a unique physical configuration representing data, the conductive pattern on each sheet having portions, each portion being in inductive coupling relationship to a predetermined degree with a respective one of said solenoid;

means coupled to said solenoids and operative to energize selected ones thereof to cause signals of predetermined magnitudes to be inductively coupled to respective conductive patterns; and means coupled to each of said conductive patterns and operative to compare the magnitudes of the signals induced in respective conductive patterns.

2. The invention according to claim 1 in which each of said conductive patterns has first portions each being inductively coupled to a solenoid of a first selected group of said solenoids, and second portions each being inductively coupled to a solenoid of a second selected group of said solenoids, said first portions being coupled to said solenoids to a greater degree than said second portions.

3. The invention according to claim 1 in which each of said conductive patterns includes first partions each being inductively coupled to a solenoid of a first selected group of said solenoids to physically represent a data bit of one value, and also includes second portions each being not significantly coupled to a solenoid of a second selected group of said solenoids to physically represent a data bit of another value.

4. The invention according to claim 1 in which each conductive pattern is in the form of a conductive path extending between a pair of terminals disposed on a respective sheet, and said signal comparison means are coupled to said pattern via said pair of terminals.

5. Memory apparatus comprising:

a plurality of electrically insulative sheets each having a plurality of holes therein, the holes on each sheet being of the same number and in the same geometrical pattern, said sheets being arranged in layers with the pattern of holes in respective sheets being in registration to provide aligned openings through all of said sheets;

a plurality of solenoids each capable of providing a substantially uniform magnetic field throughout its length and each extending through a respective aligned opening in said sheets;

on each sheet, a plurality of conductive paths each path being associated with a respective one of said solenoids and in inductive coupling relationship therewith to a selected degree, the paths being connected in series between a first and a second terminal located on the sheet;

circuitry coupled to all of said solenoids and operative to energize selected ones thereof to cause signals of predetermined magnitudes to be induced into respective conductive paths;

and circuitry connected to said terminals on each of said sheets and operative in response to signals induced in said paths to compare the magnitudes of the induced signals in each series-connected plurality of paths.

6. Memory apparatus comprising:

a plurality of electrically insulative planes arranged in a stacked relationship, each plane having a like configuration of holes therein, the configuration of holes on said planes being in registration to provide aligned openings through all of the stacked planes;

a plurality of elongated solenoids each disposed within a respective aligned opening through said planes, each of said solenoids being of sufficient length to extend through all of said planes, and each constructed to provide a substantially uniform magnetic field throughout its length when suitably energized;

a conductive pattern disposed on each plane, each conductive pattern having a different physical configuration which represents data unique to that pattern, each conductive pattern being in inductive coupling relationship with a different selected group of said solenoids;

means coupled to all of said solenoids and operative to energize one of said selected groups of solenoids to cause a signal of a different magnitude to be induced into each conductive pattern;

and means coupled to each of said conductive patterns and operative in response to signals induced into said patterns to compare the magnitudes of the induced signals and ascertain the data content of the conductive pattern in coupling relationship with the energized selected group of solenoids.

References Cited

UNITED STATES PATENTS

| | | | |
|---|---|---|---|
| 3,000,004 | 9/1961 | Weller | 340—174 |
| 3,134,965 | 5/1964 | Meier | 340—174 |
| 3,184,720 | 5/1965 | Meier | 340—174 |

TERRELL W. FEARS, *Primary Examiner.*

S. M. URYNOWICZ, *Examiner.*